United States Patent
Kawashima et al.

(10) Patent No.: US 10,557,110 B2
(45) Date of Patent: Feb. 11, 2020

(54) METAL-CARRYING ZEOLITE FOR ALCOHOLIC BEVERAGES AND ALCOHOLIC BEVERAGE MANUFACTURING METHOD

(71) Applicants: IDEMITSU KOSAN CO., LTD., Chiyoda-ku (JP); THE NIKKA WHISKY DISTILLING CO., LTD., Minato-ku (JP)

(72) Inventors: Yoshimi Kawashima, Ichihara (JP); Mitsuko Murata, Chiba (JP); Shun Fukasawa, Chiba (JP); Kenji Hosoi, Kashiwa (JP); Toshikazu Sugimoto, Moriya (JP)

(73) Assignees: IDEMITSU KOSAN CO., LTD., Chiyoda-ku (JP); THE NIKKA WHISKY DISTILLING CO., LTD., Minato-ku (JP)

( * ) Notice: Subject to any disclaimer, the term of this patent is extended or adjusted under 35 U.S.C. 154(b) by 0 days.

(21) Appl. No.: 16/131,244

(22) Filed: Sep. 14, 2018

(65) Prior Publication Data

US 2019/0010434 A1    Jan. 10, 2019

Related U.S. Application Data

(63) Continuation of application No. 15/107,513, filed as application No. PCT/JP2014/083671 on Dec. 19, 2014, now Pat. No. 10,385,299.

(30) Foreign Application Priority Data

Dec. 25, 2013  (JP) .................................. 2013-266335

(51) Int. Cl.
   *C12H 1/044*      (2006.01)
   *B01J 20/18*      (2006.01)

(52) U.S. Cl.
   CPC ............ *C12H 1/0408* (2013.01); *B01J 20/18* (2013.01); *B01J 20/186* (2013.01)

(58) Field of Classification Search
   None
   See application file for complete search history.

(56) References Cited

U.S. PATENT DOCUMENTS

| | | | | |
|---|---|---|---|---|
| 5,744,183 A * | 4/1998 | Ellsworth | ............ | C12H 1/0408 426/330.4 |
| 6,215,037 B1 | 4/2001 | Padin et al. | | |
| 6,472,009 B1 * | 10/2002 | Berrebi | .................... | C12G 3/08 426/330.4 |
| 2001/0014334 A1 | 8/2001 | Seid | | |
| 2004/0057890 A1 * | 3/2004 | Satokawa | .............. | B01D 53/04 423/244.04 |
| 2006/0108262 A1 | 5/2006 | Takatsu et al. | | |
| 2007/0167530 A1 | 7/2007 | Gerlach et al. | | |
| 2010/0160152 A1 | 6/2010 | Nagayasu et al. | | |
| 2014/0220153 A1 | 8/2014 | Pagotto Simoes | | |
| 2014/0329899 A1 | 11/2014 | Nakamura | | |
| 2016/0000088 A1 | 1/2016 | Nakamura | | |
| 2016/0030931 A1 | 2/2016 | Kelkar | | |
| 2016/0128245 A1 | 5/2016 | Tanokuchi | | |
| 2016/0213049 A1 * | 7/2016 | O'Connor | ................. | A23L 2/80 |
| 2017/0037347 A1 | 2/2017 | Hosoi | | |
| 2017/0190813 A1 | 7/2017 | Nacharaju | | |
| 2017/0260486 A1 * | 9/2017 | Ottens | .................. | C12H 1/0424 |
| 2018/0036711 A1 | 2/2018 | Fukasawa | | |

FOREIGN PATENT DOCUMENTS

| | | |
|---|---|---|
| CN | 86 1 07014 A | 5/1988 |
| CN | 1732250 B | 11/2011 |
| DE | 102008 050464 A1 | 8/2008 |
| JP | 55-144879 A | 11/1980 |
| JP | 63-116685 A | 5/1988 |
| JP | 63-137668 A | 6/1988 |
| JP | 64-5481 A | 1/1989 |
| JP | 3-187374 A | 8/1991 |
| JP | 6-239713 | 8/1994 |
| JP | 2004-222567 A | 8/2004 |
| JP | 2006-36616 A | 2/2006 |
| JP | 2006-44965 A | 2/2006 |
| JP | 2006-55771 A | 3/2006 |
| JP | 2008-138153 A | 6/2008 |
| JP | 2011-20072 A | 2/2011 |
| JP | 2012-16321 A | 1/2012 |

OTHER PUBLICATIONS

Combined Office Action and Search Report dated Sep. 28, 2018 in Taiwanese Patent Application No. 103144508 (with English translation of categories of cited documents).
European Office Action dated Sep. 21, 2018 in Patent Application No. 14 874 614.2.
International Search Report dated Mar. 17, 2015 in PCT/JP2014/083671 Filed Dec. 19, 2014.
Extended European Search Report dated Jul. 11, 2017 in European Patent Application No. 14874614.2.
Database WPI, Thomson Scientific, Feb. 16, 1993, XP002771657, 1 Page.
European Office Action dated Sep. 24, 2019, in European Patent Application No. 14874614.2.

* cited by examiner

*Primary Examiner* — Ana M Fortuna
(74) *Attorney, Agent, or Firm* — Oblon, McClelland, Maier & Neustadt, L.L.P.

(57) ABSTRACT

The metal-supported zeolite for alcoholic beverages of the present invention is a zeolite that carries a metal component, wherein the metal component is silver, and the zeolite is at least one selected from a beta-type one and a Y-type one. The metal-supported zeolite is for removing unwanted components contained in alcoholic beverages.

10 Claims, No Drawings

METAL-CARRYING ZEOLITE FOR ALCOHOLIC BEVERAGES AND ALCOHOLIC BEVERAGE MANUFACTURING METHOD

CROSS-REFERENCE TO RELATED APPLICATIONS

The present application is a continuation of U.S. application Ser. No. 15/107,513, filed Jun. 23, 2016, which is a national stage application of PCT Application No. PCT/JP2014/083671, filed Dec. 19, 2014, the disclosures of which are incorporated herein by reference in their entireties. This application claims priority to Japanese Application No. 2013-266335, filed Dec. 25, 2013.

TECHNICAL FIELD

The present invention relates to a metal-supported zeolite for alcoholic beverages for removing unwanted components contained in alcoholic beverages, and to a method for producing an alcoholic beverage using the metal-supported zeolite for alcoholic beverages.

BACKGROUND ART

Some alcoholic beverages are, while stored in barrels, matured for at least 4 to 6 years, generally for 7 to 10 years, but for a longer period of time of about 20 years, like whisky.

During storage, there may occur evaporation and annihilation of unmatured components such as sulfur compounds, etc.; reaction (oxidation, acetalization, esterification, etc.) of new make spirits (fresh whisky)-derived components, decomposition of barrel materials-derived components, reaction of raw material-derived components released in barrels and raw whisky, state change of ethanol and water constituting raw whisky, etc., whereby maturated whisky can come to have taste intrinsic thereto.

However, during storage, raw whisky may be absorbed by barrels or may evaporate through barrels, and therefore the amount of the stored raw whisky naturally decreases. Consequently, prolongation of the storage period causes increase in product loss, from the viewpoint of production efficiency.

Given the situation, a method of proactively removing unwanted components for alcoholic beverages, for example, unmatured components such as sulfur compounds and the like, precipitated components to form in a cold season, unpleasant odor components and others, from alcoholic beverages without waiting for spontaneous change thereof to occur during storage, is taken into consideration.

As a method of removing unwanted components from alcoholic beverages, for example, there have already been proposed a method of bringing alcoholic beverages into contact with an adsorbent prepared by processing silica with an organic silane compound (see PTL 1), a method of bringing alcoholic beverages into contact with activated carbon (see PTL 2), a method of using an ion-exchange resin (see PTL 3), a method of using metal particles and a resin layer (see PTL 4), etc.

However, there is room for further improvement in the above-mentioned prior-art technologies for providing products capable of satisfying quality on a higher level.

CITATION LIST

Patent Literature

PTL 1: JP 63-137668 A
PTL 2: JP 03-187374 A
PTL 3: JP 2004-222567 A
PTL 4: JP 2012-016321 A

SUMMARY OF INVENTION

Technical Problem

The present invention is to provide a metal-supported zeolite for alcoholic beverages capable of efficiently removing unwanted components contained in alcoholic beverages, and to provide a method for producing alcoholic beverages using the metal-supported zeolite for alcoholic beverages.

Solution to Problem

The present inventors have found that, when an alcoholic beverage is made to pass through a specific metal-supported zeolite, unwanted components contained in the alcoholic beverage can be removed, and accordingly the above-mentioned problems can be solved.

Specifically, the gist of the present invention includes the following:

[1] A metal-supported zeolite for alcoholic beverages, in which a metal component is supported on zeolite, the metal component is silver and the zeolite is at least one selected from a beta-type one and a Y-type one, and which is for removing unwanted components contained in alcoholic beverages.

[2] The metal-supported zeolite for alcoholic beverages according to [1], wherein the amount of the silver supported therein is 5% by mass to 25% by mass relative to the total amount of the metal-supported zeolite for alcoholic beverages.

[3] The metal-supported zeolite for alcoholic beverages according to [1] or [2], wherein the alcoholic beverage is a distilled alcoholic beverage.

[4] The metal-supported zeolite for alcoholic beverages according to [1] or [2], wherein the alcoholic beverage is a brewed alcoholic beverage.

[5] A method for producing an alcoholic beverage, including a purifying step of purifying the alcoholic beverage, wherein in the purifying step, unwanted components contained in the alcoholic beverage are removed by the metal-supported zeolite for alcoholic beverages of any of [1] to [4].

Advantageous Effects of Invention

According to the present invention, there can be provided a metal-supported zeolite for alcoholic beverages capable of efficiently removing unwanted components contained in alcoholic beverages, and a method for producing alcoholic beverages using the metal-supported zeolite for alcoholic beverages.

DESCRIPTION OF EMBODIMENTS

[Metal-Supported Zeolite for Alcoholic Beverages]

The metal-supported zeolite for alcoholic beverages according to an aspect of the present invention is a zeolite that carries a metal component, wherein the metal component is silver, and the zeolite is at least one selected from a beta-type one and a Y-type one, and the metal-supported zeolite is for removing unwanted components contained in alcoholic beverages.

The unwanted components to be removed are components that detract from the taste of alcoholic beverages, mainly including unappetizing components. The unappetizing components include sulfur compounds such as dimethyl sulfide, dimethyl disulfide, dimethyl trisulfide, etc. They also include nitrogen compounds such as pyridine, etc.

The metal-supported zeolite for alcoholic beverages according to this embodiment removes the above-mentioned unwanted components contained in alcoholic beverages, but can leave flavor components such as higher alcohols, fusels, esters and the like in alcoholic beverages.

The targeted alcoholic beverages are not specifically limited, and the present invention is applicable to all kinds of alcoholic beverages. Concretely, the present invention is applicable to all kinds of distilled alcoholic beverages such as whisky, brandy, gin, vodka, tequila, rum, white sake, arrack, etc. The present invention is also applicable to all kinds of brewed alcoholic beverages and mixed liquors such as refined sake, beer, wine, fortified wine, Chinese alcoholic beverages, etc. Among brewed alcoholic beverages and mixed liquors, refined sake is favorably used. Further, the present invention is applicable to all kinds of shochu including barley shochu, rice shochu, sweet potato shochu, kokutoshu (distilled liquor made from brown sugar), buckwheat shochu, corn shochu, kasutori shochu (shochu made from sake lees), awamori (a kind of shochu made in Okinawa), etc.

[Zeolite]

Regarding the structure of zeolite that constitutes the metal-supported zeolite for alcoholic beverages of this embodiment, at least one selected from a beta-type one and a Y-type one is employable. Among these, zeolite having a FAU or BEA structure, which has 12-membered or 10-membered micropores, is preferred.

The BET specific surface area of zeolite is preferably 500 m$^2$/g to 900 m$^2$/g, more preferably 550 m$^2$/g to 850 m$^2$/g.

The micropore volume of zeolite is preferably 0.05 cc/g to 0.40 cc/g, more preferably 0.10 cc/g to 0.35 cc/g.

The metal-supported zeolite for alcoholic beverage of this embodiment may be shaped along with a binder component added thereto. Regarding the amount of the binder component to be added, it is desirable that the binder component is added in an amount of preferably 5% by mass to 50% by mass, more preferably 10% by mass to 30% by mass, based on the total amount of the metal-supported zeolite shaped body, and then the resultant is shaped.

The mean particle size of the zeolite shaped body is preferably 0.1 mm to 5 mm, more preferably 0.3 mm to 3 mm, even more preferably 0.5 mm to 2 mm.

As the usable binder component, alumina, silica or the like is preferred. From the viewpoint of facilitating shaping, a clay mineral such as bentonite, vermiculite or the like, or an organic additive such as cellulose or the like may be further added. The above-mentioned binder component may be added to zeolite and then shaped into a metal-supported zeolite shaped body, according to an ordinary method such as extrusion molding, tabletting, rotary granulation, spray drying or the like.

[Method for Producing Metal-Supported Zeolite for Alcoholic Beverages]

As a method for producing the metal-supported zeolite for alcoholic beverage, there may be mentioned an ion-exchange method. In an ion-exchange method, a metal ion is supported inside the crystal of zeolite through ion exchange. In the metal-supported zeolite for alcoholic beverage of this embodiment, silver may be used as the metal component to be supported on zeolite.

As a method of exchanging the ions inside the zeolite crystal for a metal ion and making the zeolite crystal carry the metal ion inside it, there may be mentioned a method where zeolite is put in a solution containing a metal ion, and the zeolite is kept in contact with the metal ion-containing solution at room temperature to about 80° C. for one to a few hours. This operation may be repeated plural times.

In this embodiment, for the solution containing a metal ion, a water-soluble metal salt such as a nitrate, a chloride or the like is usable. A solution prepared by dissolving a metal compound in an aqueous ammonia to form a metal ammine complex ion therein is also usable. Specifically, silver nitrate and ammonium nitrate are usable.

After a metal ion is supported inside the zeolite crystal through ion exchange, the crystal may be washed with water and then dried at a temperature of 50° C. or more, preferably around 50° C. or more to 200° C. or less. After dried, this may be calcined at a temperature of 500° C. or less, preferably around 200° C. to 500° C. for a few hours.

In the metal-supported zeolite for alcoholic beverage of this embodiment, the total amount of the metal supported on zeolite is preferably 5% by mass to 25% by mass, more preferably 5% by mass to 20% by mass, still more preferably 6% by mass to 20% by mass, and most preferably 6% by mass to 18% by mass, based on the total amount of the metal-supported zeolite for alcoholic beverages. When the amount of the supported metal is less than 5% by mass, unwanted components contained in beverages could not be removed sufficiently, but when more than 25% by mass, ion exchange with metal would be difficult so that metal may aggregate and the unwanted components removal efficiency per metal would lower. Silver is preferred for the metal.

[Method for Producing Alcoholic Beverages]

The production method for alcoholic beverages according to the embodiment of the present invention includes a purification step for purifying alcoholic beverages, and in the purification step, unwanted components contained in alcoholic beverages are removed by the above-mentioned metal-supported zeolite for alcoholic beverages.

The purification condition where the metal-supported zeolite for alcoholic beverages is used is as follows.

When the concentration of sulfur compounds in raw whisky is 100 ppm by volume or less, desulfurization with the above-mentioned metal-supported zeolite for alcoholic beverages is applicable thereto. The concentration of sulfur compounds is preferably 10 ppm by volume or less.

The temperature range is −50° C. to 150° C., preferably −50° C. to 120° C., more preferably −20° C. to 100° C.

In the case of a system where raw whisky is made to pass through the above-mentioned metal-supported zeolite for alcoholic beverages, the range of the liquid-hourly space velocity (LHSV) is 0.1 h$^{-1}$ to 100 h$^{-1}$, more preferably 0.5 to 50 h$^{-1}$, even more preferably 1 to 30 h$^{-1}$.

Under the above-mentioned purification condition, unwanted components can be removed while flavor components such as high alcohols, fusels, esters and others can be left in alcoholic beverages.

EXAMPLES

Hereinunder the present invention is described in more detail with reference to Examples. The present invention is not limited to the following Examples.

[Evaluation Method]

The components of the alcoholic beverage under test to be mentioned below were analyzed according to the following method.

<Quantitative Determination of Silver Amount Supported on Metal-Supported Zeolite for Alcoholic Beverages>

The amount of silver supported on the metal-supported zeolite for alcoholic beverages was quantitatively determined using an ICP emission spectrometer, 720-ES manufactured by Agilent Technologies, Inc.

<Componental Analysis of Alcoholic Beverages>

(Evaluation Test 1: Batch Process)

Sulfur compounds (dimethyl sulfide (DMS), dimethyl disulfide (DMDS) and dimethyl trisulfide (DMTS)) and various esters and fusels in an alcoholic beverage under test were analyzed using a head space gas chromatography mass spectrometer (head space injector "MultiPurpose Sampler MPS2", manufactured by Gerstel Corporation).

Next, the alcoholic beverage under test and a desulfurizing agent under test were put in a container to carry out desulfurization. Specifically, 700 ml of the alcoholic beverage under test and 14 ml of the desulfurizing agent under test that had been processed with distilled water applied thereto were put in a 1-liter container and shaken for 4 hours.

Subsequently, using the head space gas chromatography mass spectrometer, the sulfur compounds, the esters and the fusels in the alcoholic beverage under test were again quantitatively determined.

With respect to the sulfur compounds, a removal rate thereof (referred to as a desulfurization rate) was adopted. The desulfurization rate of 100% means that the abundance of the compounds after the test is less than a detectable level.

(Evaluation Test 2: Passing Process)

In the passing process, the components of the undesulfurized alcoholic beverage under test were analyzed, and then 100 ml of the resultant alcoholic beverage under test was made to pass through a column having a diameter of 1 cm and containing 5 cm$^3$ of the desulfurizing agent under test previously sealed up therein. After this, the components in the alcoholic beverage under test were again analyzed. The passing condition was LHSV=10 h$^{-1}$.

(Method for Quantitative Determination of Pyridine)

Before and after the above-mentioned shaking operation, the abundance of pyridine contained in the alcoholic beverage under test was quantitatively determined using the above-mentioned head space injector, and was expressed as a removal rate (referred to as a desulfurization rate). The catalyst treatment for evaluation of pyridine removal was carried out under the same passing system as in the component evaluation test 2. The passing condition was LHSV=10 h$^{-1}$.

[Catalyst Production Examples]

Production Example 1

A commercial product, NaY-type zeolite shaped body (manufactured by Tosoh Corporation, HSZ-320NAD1A) was ground into particles having a regulated mean particle size of 0.5 to 1 mm. 240 g of ammonium nitrate was dissolved in 3 L of water, 1 kg of the zeolite was put thereinto, and the liquid was stirred for 3 hours for ion-exchange treatment to give an NH$_4$Y-type zeolite. After washed with water and dried, 1 kg of the NH$_4$Y-type zeolite was put into a silver ammine complex ion solution prepared by dissolving 394 g of silver nitrate and 330 g of ammonia (30%) in 2.5 L of water, and the liquid was stirred for 3 hours for Ag ion-exchange, and further washed with water and dried. Subsequently, this was calcined at 400° C. for 3 hours to produce an AgY-type zeolite 1.

Production Example 2

A commercial product, NaY-type zeolite shaped body (manufactured by Tosoh Corporation, HSZ-320NAD1A) was ground into particles having a regulated mean particle size of 0.5 to 1 mm. One kg of the zeolite was put into a solution prepared by dissolving 394 g of silver nitrate in 2.5 L of water, and the liquid was stirred for 3 hours for silver ion-exchange. After washed with water and dried, this was calcined at 400° C. for 3 hours to produce an AgY-type zeolite 2.

Production Example 3

A commercial product, NaY-type zeolite shaped body (manufactured by Tosoh Corporation, HSZ-320NAD1A) was ground into particles having a regulated mean particle size of 0.5 to 1 mm. 240 g of ammonium nitrate was dissolved in 3 L of water, 1 kg of the zeolite was put thereinto, and the liquid was stirred for 3 hours for ion-exchange treatment to give an NH$_4$Y-type zeolite. After washed with water and dried, 1 kg of the NH$_4$Y-type zeolite was put into a silver ammine complex ion solution prepared by dissolving 98.5 g of silver nitrate and 82.5 g of ammonia (30%) in 2.5 L of water, and the liquid was stirred for 3 hours for Ag ion-exchange, and further washed with water and dried. Subsequently, this was calcined at 400° C. for 3 hours to produce an AgY-type zeolite 3.

Production Example 4

A commercial product, beta-type zeolite shaped body (manufactured by Tosoh Corporation, HSZ-930NHA) was ground into particles having a regulated mean particle size of 0.5 to 1 mm. 240 g of ammonium nitrate was dissolved in 3 L of water, 1 kg of the zeolite was put thereinto, and the liquid was stirred for 3 hours for ion-exchange treatment to give an NH$_4$Y-type zeolite. After washed with water and dried, 1 kg of the NH$_4$Y-type zeolite was put into a silver ammine complex ion solution prepared by dissolving 394 g of silver nitrate and 330 g of ammonia (30%) in 2.5 L of water, and the liquid was stirred for 3 hours for Ag ion-exchange, and further washed with water and dried. Subsequently, this was calcined at 400° C. for 3 hours to produce an Agβ-type zeolite 4.

EXAMPLES AND COMPARATIVE EXAMPLES

Example 1-1

Whisky (new make malt whisky (alcohol content 62%)) was made to pass through the AgY-type zeolite 1 obtained in Production Example 1, and based on the evaluation test 1 (batch process), the components before and after the liquid passing were compared. Whisky before the batch treatment contained 1.7816 ppm of DMS, 0.4226 ppm of DMDS and 0.0032 ppm of DMTS. The desulfurization rate is shown in Table 1. In addition, the abundance amount of esters and fusels is shown in Table 2.

Examples 1-2 to 1-4

Whisky (new make malt whisky (alcohol content 62%)) was made to pass through the AgY-type zeolite 2 obtained in Production Example 2, and based on the above-mentioned evaluation test, the components before and after the liquid passing were compared.

Whisky (new make malt whisky (alcohol content 62%)) was made to pass through the AgY-type zeolite 3 obtained in Production Example 3, and based on the above-mentioned evaluation test, the components before and after the liquid passing were compared.

Whisky (new make malt whisky (alcohol content 62%)) was made to pass through the Agβ-type zeolite 4 obtained in Production Example 4, and based on the above-mentioned evaluation test, the components before and after the liquid passing were compared.

In Examples 1-2 to 1-4, the desulfurization rate alone was evaluated. The results are shown in Table 1.

Example 2-1

Shochu (barley shochu (atmospheric distillation product, alcohol content 25%)) was made to pass through the AgY-type zeolite 1 obtained in Production Example 1, and based on the evaluation test 1 (batch process), the components before and after the liquid passing were compared. Shochu before the batch treatment contained 0.0087 ppm of DMS, 0.0122 ppm of DMDS and 0.0116 ppm of DMTS. The desulfurization rate is shown in Table 1.

Example 3-1

Rum (commercial product rum (white rum, alcohol content 37%)) was made to pass through the AgY-type zeolite 1 obtained in Production Example 1, and based on the evaluation test 1 (batch process), the components before and after the liquid passing were compared. Rum before the batch treatment contained 0.0526 ppm of DMS, 0.0030 ppm of DMDS and 0.0016 ppm of DMTS. The desulfurization rate is shown in Table 1. The abundance amount of esters and fusels is shown in Table 3.

Example 4-1

Old sake prepared by aging a commercial product, refined sake (authentically brewed sake, alcohol content 16%) at 70° C. for 1 week was made to pass through the AgY-type zeolite 1 obtained in Production Example 1, and based on the evaluation test 1 (batch process), the components before and after the liquid passing were compared. Refined sake naturally contains few DMS and DMTS, and one offending substance therein to cause unpleasant odor is considered to be DMTS. From this, the desulfurization effect to remove DMTS was confirmed. Old sake before the batch treatment contained 0.0025 ppm of DMTS. The desulfurization rate is shown in Table 1.

TABLE 1

| | Zeolite Structure | Supported Silver Amount (mass %) | Species of Alcoholic Beverages | Desulfurization Rate | | |
|---|---|---|---|---|---|---|
| | | | | DMS (%) | DMDS (%) | DMTS (%) |
| Example 1-1 | AgY-type zeolite 1 | 13 | malt whisky (alcohol content 62%) | 98.06 | 82.73 | 100 |
| Example 1-2 | AgY-type zeolite 2 | 16 | malt whisky (alcohol content 62%) | 100 | 81.31 | 100 |
| Example 1-3 | AgY-type zeolite 3 | 6 | malt whisky (alcohol content 62%) | 91.51 | 70.09 | 75 |
| Example 1-4 | Agβ-type zeolite 4 | 11 | malt whisky (alcohol content 62%) | 100 | 98.26 | 100 |
| Example 2-1 | AgY-type zeolite 1 | 13 | barley shochu, atmospheric distillation product (alcohol content 25%) | 100 | 53.28 | 67.24 |
| Example 3-1 | AgY-type zeolite 1 | 13 | rum (alcohol content 37%) | 100 | 76.67 | 62.5 |
| Example 4-1 | AgY-type zeolite 1 | 13 | old sake (alcohol content 16%) | — | — | 100 |

TABLE 2

Whisky Evaluation Results

| | | before desulfurization (ppm) | after desulfurization (ppm) | remarks |
|---|---|---|---|---|
| Esters | Ethyl lactate | 4.769 | 4.808 | Difference is within acceptable range. |
| | Furfural | 7.601 | 7.048 | Difference is within acceptable range. |
| | i-Amyl acetate | 38.837 | 39.101 | Difference is within acceptable range. |
| | Ethyl caproate (C6) | 6.441 | 6.378 | Difference is within acceptable range. |
| | β-Phenethyl alc. | 11.553 | 10.961 | Difference is within acceptable range. |
| | Ethyl caprylate (C8) | 16.307 | 16.156 | Difference is within acceptable range. |
| | β-Phenethyl acetate | 10.599 | 10.457 | Difference is within acceptable range. |
| | Ethyl caprate (C10) | 43.011 | 42.603 | Difference is within acceptable range. |
| | Ethyl laurate | 38.644 | 38.434 | Difference is within acceptable range. |
| | Ethyl myristate (C14) | 4.454 | 4.475 | Difference is within acceptable range. |
| | Ethyl palmitoleate | 4.185 | 4.152 | Difference is within acceptable range. |
| | Ethyl palmitate | 11.191 | 11.126 | Difference is within acceptable range. |
| | Ethyl linoleate | 0.985 | 0.897 | Difference is within acceptable range. |
| Fusels | Acetaldehyde | 13.743 | 13.82 | Difference is within acceptable range. |
| | Ethyl acetate | 493.057 | 488.059 | Difference is within acceptable range. |
| | Me—OH | 30.323 | 29.836 | Difference is within acceptable range. |
| | 2-Butanol | 0 | 0 | Difference is within acceptable range. |
| | n-Propanol | 201.225 | 199.948 | Difference is within acceptable range. |
| | i-Butanol | 365.233 | 363.026 | Difference is within acceptable range. |

TABLE 2-continued

Whisky Evaluation Results

| | | before desulfurization (ppm) | after desulfurization (ppm) | remarks |
|---|---|---|---|---|
| | Allyl alcohol | 0 | 0 | Difference is within acceptable range. |
| | i-Amyl alcohol | 914.575 | 907.84 | Difference is within acceptable range. |

TABLE 3

Rum Evaluation Results

| | | before desulfurization (ppm) | after desulfurization (ppm) | remarks |
|---|---|---|---|---|
| Esters | Ethyl lactate | 4.098 | 4.084 | Difference is within acceptable range. |
| | Furfural | 20.481 | 17.605 | Difference is within acceptable range. |
| | i-Amyl acetate | 3.462 | 3.461 | Difference is within acceptable range. |
| | Ethyl caproate (C6) | 2.696 | 1.454 | Difference is within acceptable range. |
| | β-Phenethyl alc. | 111.71 | 112.187 | Difference is within acceptable range. |
| | Ethyl caprylate (C8) | 9.818 | 9.145 | Difference is within acceptable range. |
| | β-Phenethyl acetate | 3.898 | 3.651 | Difference is within acceptable range. |
| | Ethyl caprate (C10) | 37.925 | 35.144 | Difference is within acceptable range. |
| | Ethyl laurate | 24.745 | 24.187 | Difference is within acceptable range. |
| | Ethyl myristate (C14) | 4.137 | 4.096 | Difference is within acceptable range. |
| | Ethyl palmitoleate | 1.378 | 1.299 | Difference is within acceptable range. |
| | Ethyl palmitate | 13.435 | 13.288 | Difference is within acceptable range. |
| | Ethyl linoleate | 3.59 | 3.255 | Difference is within acceptable range. |
| Fusels | Acetaldehyde | 304.79 | 282.01 | Difference is within acceptable range. |
| | Ethyl acetate | 64.44 | 59.34 | Difference is within acceptable range. |
| | Me—OH | 27.06 | 28.36 | Difference is within acceptable range. |
| | 2-Butanol | 0 | 0 | Difference is within acceptable range. |
| | n-Propanol | 152.5 | 146.35 | Difference is within acceptable range. |
| | i-Butanol | 1243.91 | 1197.42 | Difference is within acceptable range. |

TABLE 3-continued

Rum Evaluation Results

| | | before desulfurization (ppm) | after desulfurization (ppm) | remarks |
|---|---|---|---|---|
| | Allyl alcohol | 0 | 0 | Difference is within acceptable range. |
| | i-Amyl alcohol | 1698.56 | 1631.07 | Difference is within acceptable range. |

Example 5-1

Whisky (new make malt whisky (alcohol content 62%)) was made to pass through the AgY-type zeolite 1 obtained in Production Example 1, and based on the evaluation test 2 (passing process), the components before and after the passing treatment were compared. Whisky before the passing treatment contained 2.0103 ppm of DMS, 0.3662 ppm of DMDS and 0.0044 ppm of DMTS. The desulfurization rate is shown in Table 4.

Example 6-1

Shochu (sweet potato shochu (atmospheric distillation product, alcohol content 37%)) was made to pass through the AgY-type zeolite 1 obtained in Production Example 1, and based on the evaluation test 2 (passing process), the components before and after the passing treatment were compared. Shochu before the passing treatment contained 0.0134 ppm of DMS, 0.0143 ppm of DMDS and 0.0074 ppm of DMTS. The desulfurization rate is shown in Table 4.

Example 7-1

Shochu (barley shochu (atmospheric distillation product, alcohol content 25%)) was made to pass through the AgY-type zeolite 1 obtained in Production Example 1, and based on the evaluation test 2 (passing process), the components before and after the passing treatment were compared. Shochu before the passing treatment contained 0.0026 ppm of DMS, 0.0048 ppm of DMDS and 0.0011 ppm of DMTS. The desulfurization rate is shown in Table 4.

Example 8-1

Shochu (barley shochu (reduced-pressure distillation product, alcohol content 25%)) was made to pass through the AgY-type zeolite 1 obtained in Production Example 1, and based on the evaluation test 2 (passing process), the components before and after the passing treatment were compared. Shochu before the passing treatment contained 0.0040 ppm of DMS, 0.0020 ppm of DMDS and 0.0022 ppm of DMTS. The desulfurization rate is shown in Table 4.

TABLE 4

| | Zeolite Structure | Supported Silver Amount (mass %) | Species of Alcoholic Beverages | Desulfurization Rate | | |
|---|---|---|---|---|---|---|
| | | | | DMS (%) | DMDS (%) | DMTS (%) |
| Example 5-1 | AgY-type zeolite 1 | 13 | malt whisky (alcohol content 62%) | 100 | 99.65 | 100 |
| Example 6-1 | AgY-type zeolite 1 | 13 | sweet potato shochu, atmospheric distillation product (alcohol content 37%) | 100 | 100 | 100 |

TABLE 4-continued

| | Zeolite Structure | Supported Silver Amount (mass %) | Species of Alcoholic Beverages | Desulfurization Rate | | |
|---|---|---|---|---|---|---|
| | | | | DMS (%) | DMDS (%) | DMTS (%) |
| Example 7-1 | AgY-type zeolite 1 | 13 | barley shochu, atmospheric distillation product (alcohol content 25%) | 100 | 100 | 100 |
| Example 8-1 | AgY-type zeolite 1 | 13 | barley shochu, reduced-pressure distillation product (alcohol content 25%) | 100 | 100 | 100 |

Results of evaluation of pyridine removal from alcoholic beverages using the metal-supported zeolite for alcoholic beverages in Production Example 1 are shown in Table 5. Regarding the pyridine content before liquid passing, the pyridine content before and after desulfurization in the evaluation test 1 (batch process) or the evaluation test 2 (passing process) was compared.

Whisky before batch-process desulfurization contained 0.0606 ppm of pyridine. Malt whisky before passing-process desulfurization contained 0.0949 ppm of pyridine. Similarly, sweet potato shochu (atmospheric distillation product, alcohol content 37%) contained 0.0359 ppm of pyridine, and barley shochu (reduced-pressure distillation product, alcohol content 25%) contained 0.0207 ppm of pyridine.

TABLE 5

| Zeolite Structure | Species of Alcoholic Beverages | Test Method | Pyridine Removal Rate (%) |
|---|---|---|---|
| AgY-type Zeolite 1 | malt whisky (alcohol content 62%) | batch process | 100 |
| AgY-type Zeolite 1 | malt whisky (alcohol content 62%) | passing process | 100 |
| AgY type Zeolite 1 | sweet potato shochu, atmospheric distillation product (alcohol content 37%) | passing process | 100 |
| AgY-type Zeolite 1 | barley shochu, reduced-pressure distillation product (alcohol content 25%) | passing process | 100 |

Example 9-1

Beer (100% malt beer, alcohol content 6%) was made to pass through the AgY-type zeolite 1 obtained in Production Example 1, and based on the evaluation test 1 (batch process), the components before and after the liquid passing were compared. Beer before the batch treatment contained DMS alone in an amount of 0.0384 ppm among the three sulfur compounds. The desulfurization rate is shown in Table 6.

Example 10-1

Wine (red wine, alcohol content 10%) was made to pass through the AgY-type zeolite 1 obtained in Production Example 1, and based on the evaluation test 1 (batch process), the components before and after the liquid passing were compared. Of the three sulfur compounds, DMS was not detected in wine before the batch treatment, and DMDS was contained therein in an amount of 0.0128 ppm and DMTS in an amount of 0.0009 ppm. The desulfurization rate is shown in Table 6.

Example 11-1

Grappa, a kind of brandy (alcohol content 36%) was made to pass through the AgY-type zeolite 1 obtained in Production Example 1, and based on the evaluation test 1 (batch process), the components before and after the liquid passing were compared. Grappa before the batch treatment contained 0.0028 ppm of DMS, 0.0385 ppm of DMDS, and 0.0028 ppm of DMTS. The desulfurization rate is shown in Table 6.

TABLE 6

| | Zeolite Structure | Supported Silver Amount (mass %) | Species of Alcoholic Beverages | Desulfurization Rate | | |
|---|---|---|---|---|---|---|
| | | | | DMS (%) | DMDS (%) | DMTS (%) |
| Example 9-1 | AgY-type Zeolite 1 | 13 | beer (100% malt) (alcohol content 6%) | 35.56 | — | — |
| Example 10-1 | AgY-type Zeolite 1 | 13 | wine (red wine) (alcohol content 10%) | — | 100 | 100 |
| Example 11-1 | AgY-type Zeolite 1 | 13 | grappa (alcohol content 36%) | 100 | 97.08 | 100 |

Examples 12 to 21

According to the same method as in Production Example 1, AgY-type zeolites differing in the supported silver amount and the particle size were produced. The granular AgY-type zeolite was suspended in water, the resultant suspension was put in a columnar container having a diameter of 1.0 cm, and filled therein to a height of 23 cm. The particle size was measured, using Camsizer/digital image analyzing particle size distribution measurement apparatus (Horiba Ltd., Retsch Technology), and expressed as a circle-equivalent diameter, Q50%.

Whisky was made to pass through the columnar container at a predetermined flow rate to be treated therein, and the components before and after the liquid passing were compared. Before the treatment, whisky contained 0.35 ppm of DMS, 0.22 ppm of DMDS, and 0.0073 ppm of DMTS. The desulfurization rate is shown in Table 7.

TABLE 7

| | | | | | Example | | | | | |
|---|---|---|---|---|---|---|---|---|---|---|
| | | 12 | 13 | 14 | 15 | 16 | 17 | 18 | 19 | 20 | 21 |
| LHSV ($h^{-1}$) | | 5 | 20 | 20 | 20 | 20 | 20 | 20 | 20 | 20 | 20 |
| Supported Silver Amount (mass %) | | 12.8 | 12.8 | 13.2 | 15.6 | 17.1 | 13.2 | 13.2 | 13.2 | 14.6 | 14.6 |
| Temperature (° C.) | | 30 | 30 | 20 | 23 | 20 | 5 | 40 | 60 | 20 | 20 |
| Mean Particle Size (mm) | | 1.28 | 1.28 | 1.14 | 1.14 | 1.14 | 1.28 | 1.28 | 1.28 | 0.44 | 1.77 |
| Desulfurization Rate | DMS (%) | 100 | 100 | 100 | 99 | 94 | 90 | 83 | 75 | 100 | 88 |
| | DMDS (%) | 100 | 47 | 42 | 58 | 71 | 21 | 61 | 57 | 79 | 38 |

[Evaluation Results]

From the above results, it is known that, by making alcoholic beverages to pass through the metal-supported zeolite of Examples of the present invention, unappetizing components can be removed while keeping flavor components left in the alcoholic beverages.

The invention claimed is:

1. A method for reducing a storage period during production of an alcoholic beverage, comprising:
   purifying an alcoholic composition by removing an unwanted component,
   wherein the unwanted component is at least one selected from the group consisting of dimethyl sulfide, dimethyl disulfide, and dimethyl trisulfide,
   the unwanted component is removed by a metal-supported zeolite comprising silver supported on a zeolite, and
   the zeolite is at least one selected from the group consisting of a beta-type zeolite and a Y-type zeolite.

2. The method according to claim 1,
   wherein an amount of the silver supported on the zeolite is 5% by mass to 25% by mass relative to the total amount of the metal-supported zeolite.

3. The method according to claim 1,
   wherein the alcoholic beverage is a distilled alcoholic beverage.

4. The method according to claim 1,
   wherein the alcoholic beverage is a brewed alcoholic beverage.

5. The method according to claim 1, wherein the purifying is performed such that an alcohol, a fusel, and an ester are maintained in the alcoholic composition.

6. The method according to claim 1, wherein the purifying is performed by contacting the alcoholic composition with the metal-supported zeolite.

7. The method according to claim 1, wherein the purifying is performed by passing the alcoholic composition through a metal-supported zeolite at a liquid-hourly space velocity (LHSV) of from 0.1 $h^{-1}$ to $100^{-1}$.

8. The method according to claim 1, further comprising: storing the purified alcoholic composition for maturation.

9. The method according to claim 8, wherein the purified alcoholic composition is stored in a barrel.

10. The method according to claim 1, wherein the alcoholic composition is raw whiskey, and the alcoholic beverage is whiskey.

* * * * *